UNITED STATES PATENT OFFICE.

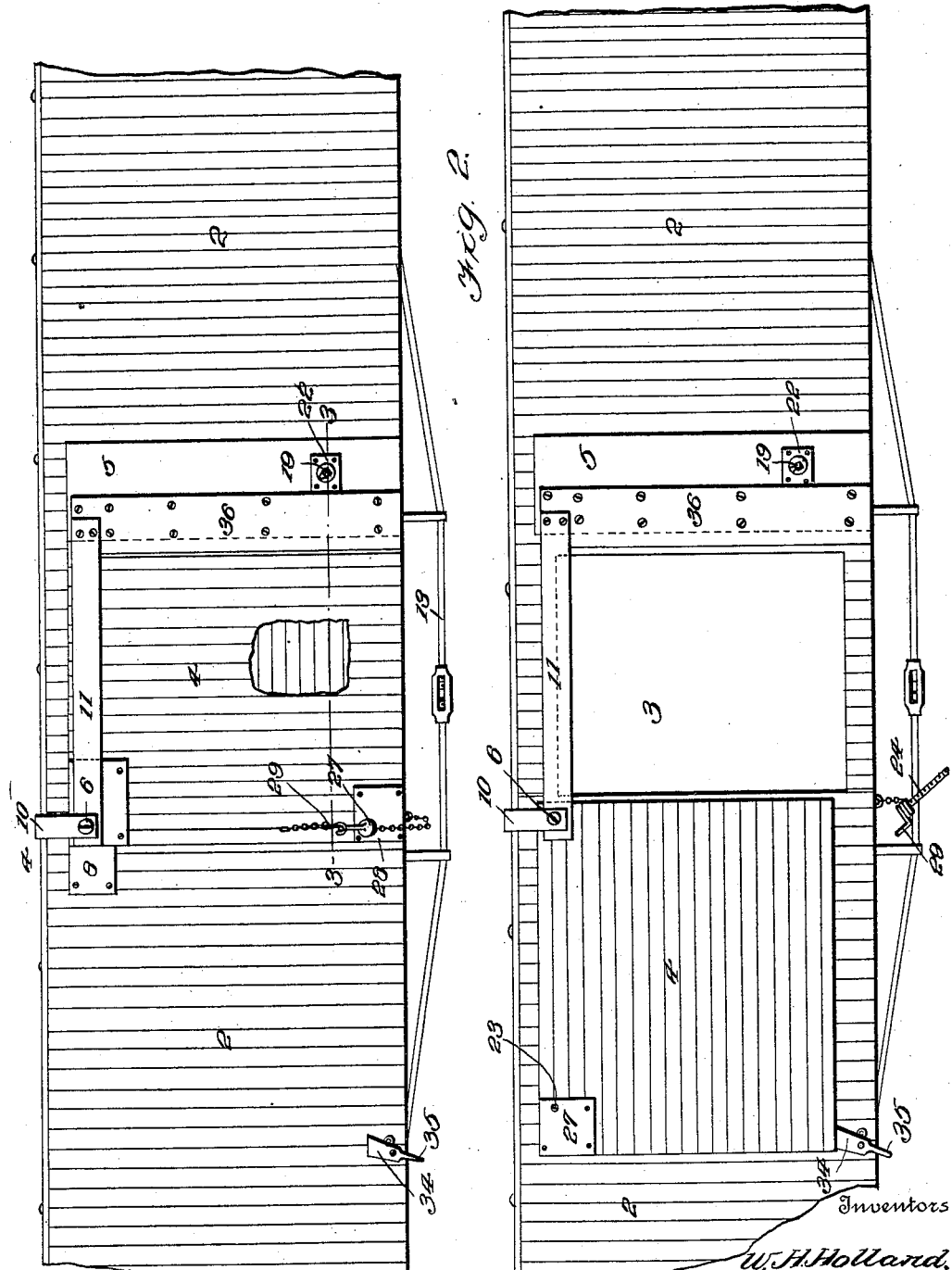

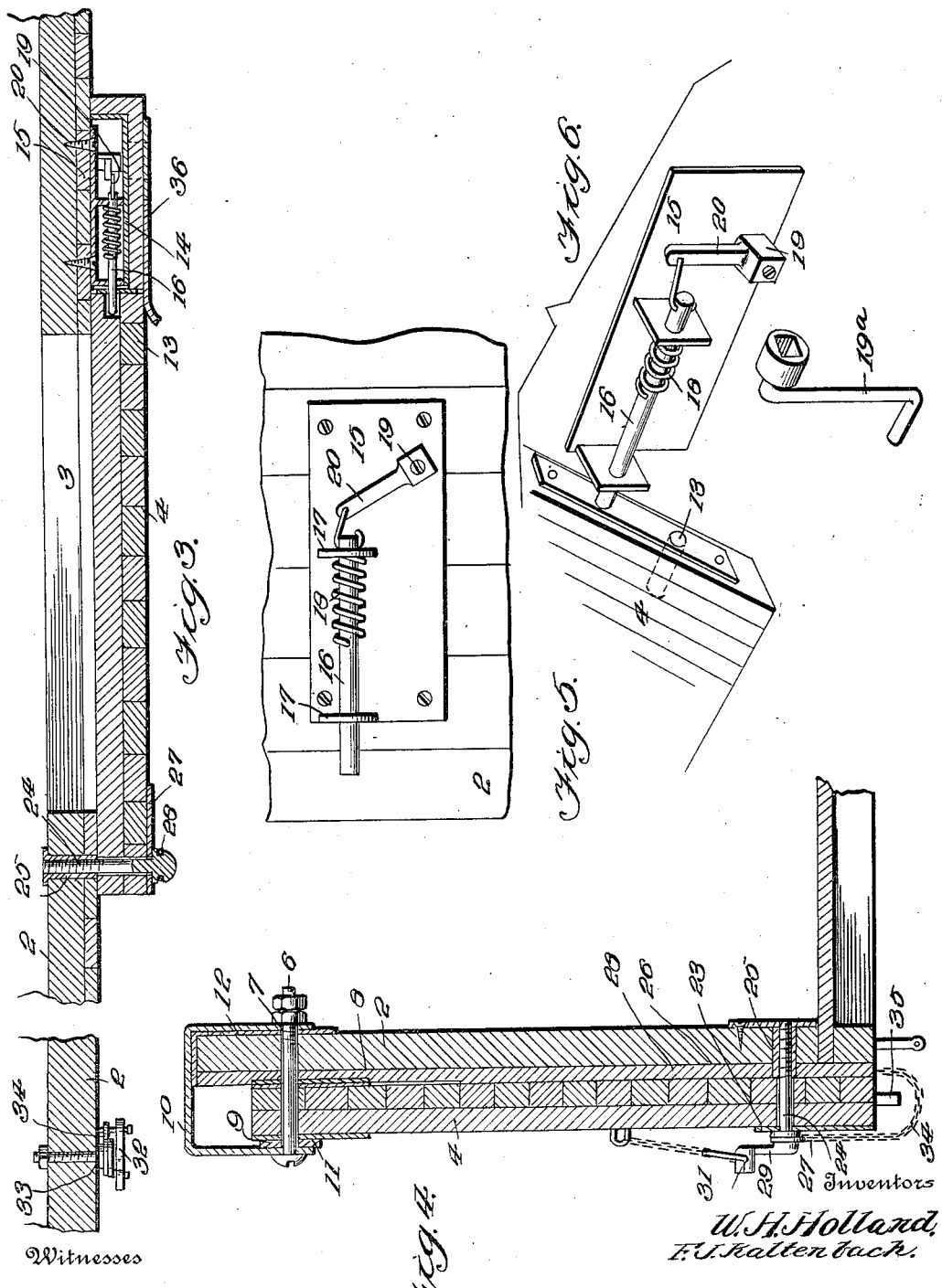

WILLIAM H. HOLLAND, OF EDGEWOOD, AND FRANK J. KALTENBACH, OF ECHO POINT, WEST VIRGINIA.

CAR-DOOR.

1,052,435.  Specification of Letters Patent.  Patented Feb. 4, 1913.

Application filed September 6, 1911. Serial No. 647,931.

*To all whom it may concern:*

Be it known that we, WILLIAM H. HOLLAND and FRANK J. KALTENBACH, citizens of the United States, residing at Edgewood and Echo Point, respectively, in the county of Ohio and State of West Virginia, have invented certain new and useful Improvements in Car-Doors, of which the following is a specification.

Our invention relates to doors for railway cars, and the primary object of the invention is the provision of a car door of a very simple and effective construction which may be securely held in its closed position and which is easily opened upon unlocking.

Another object of the invention is to provide a car door which instead of sliding, as do ordinary car doors, is pivotally mounted at one corner so that it may be shifted rotatably on its pivot in a plane parallel to the side of the car instead of being slid to its opened or closed position.

Another object is to so mount a door of this construction that the junction of the door with the abutment against which the door seats when in its closed position will be protected, thus preventing the insertion of instruments whereby the door may be disengaged from the locking means.

A further object is to provide means in connection with said door whereby the door when it is turned to its closed position may be forced against the side of the car so as to hold it in tight engagement with the side of the car and seal the door opening.

Minor objects will appear in the course of the following description.

Our invention is illustrated in the accompanying drawings wherein:

Figure 1 is a side elevation of a portion of a car with the door thereof closed. Fig. 2 is a like view to Fig. 1 but showing the door in its opened position. Fig. 3 is an enlarged horizontal section on the line 3—3 of Fig. 1. Fig. 4 is an enlarged vertical section on the line 4—4 of Fig. 1. Fig. 5 is an enlarged face view of the locking mechanism. Fig. 6 is a fragmentary perspective view of a portion of the door and the wall of a car, the door being shown in the position it will take as it moves upward to its closed position.

Corresponding and like parts are referred to in the following description and indicated in all the views of the accompanying drawings by the same reference characters.

Referring to these drawings, 2 designates a freight car of any ordinary construction and 3 designates the door opening thereof.

4 designates the door which is larger in area than the door opening and 5 designates the abutment which extends vertically at one side of the door opening against which one edge of the door bears when the door is in its closed position. The door is pivotally mounted at the upper corner away from the abutment 5 by means of the pivot bolt 6 which passes through the door, passes through the side of the car and is provided on its inside face with the lock nuts 7. Wear plates 8 of metal are disposed upon the contacting faces of the door and side of the car, and a wear plate 9 is also disposed upon the outer face of the upper corner of the door.

The angular brace 10 is attached on the inside face of the side of the car, extends over the upper edge of the car side and then downward to the front face of the upper corner of the door. Disposed between the downwardly extending end of the brace 10 is the guide strip 11. The bolt 6 passes through the brace 10, the guide strip 11 and through the door and the side of the car. The opening for the passage of the bolt 6 through both the door and the side of the car is preferably reinforced by a liner or wear tube 12. The guide strip 11 extends horizontally along the car in front of the door opening and is attached at its other end in any suitable manner to the upper end of the abutment 5. This guide strip 11 acts to hold the upper edge of the door in close contact with the side of the car when the door is in its closed position.

The edge of the door opposite to its pivotal point and at the lower corner is formed with a bolt opening 13 and the lower end of the abutment 5 is recessed as at 14 for the reception of any desired locking mechanism adapted to engage with the bolt opening 13. As shown, the locking mechanism comprises a plate 15 carrying the longitudinally shiftable bolt 16 which is supported in guiding eyes 17 and is forced to its projected position by means of a spring 18. Mounted upon a pivot bolt is a rotatable member 19 having the radial outwardly directed arm 20 connected by a link or other suitable connection to the outer extremity of the bolt 16. When the rotatable member 19 is turned in one direction, the bolt 16 will be withdrawn against the force of the spring 18 and the bolt will be withdrawn from engagement with the bolt opening 13 of the door. When released, however, the spring 18 will act to throw the bolt into engagement with the door. The rotatable member is preferably formed with a many sided shank which may be engaged by a key formed to fit the shank.

It will be obvious that the shank of the member 19 may be varied in form so that only a certain key will unlock the car door. As shown, this shank is square and the key 19ª is shown as formed with a square socket to fit the square shank. The key opening is protected by means of an escutcheon 22 upon the exterior face of the door, this escutcheon having a central opening through which the key may be inserted.

For the purpose of forcing the door toward the side of the car and holding it in such position, we provide the lower corner of the car door opposite to the bolt opening 13 with a perforation 23 through which passes a screw 24. This screw does not engage with the wall of the perforation 23 but engages with a screw threaded liner tube 25 which extends through the wall of the car. The head of the screw is formed with a collar 26, which when the screw is screwed home engages the wear plate 27 on the face of the door and forces the door inward. The head of the screw is also connected to a chain 28 whereby the screw may be connected to the car. Preferably the screw is provided with a crank at its outer end, designated 29, which crank is perforated for engagement with a hooked wire or other suitable fastening device attached to the car door itself. After the screw is screwed home, this hook, wire or other device 30 may be engaged with the crank through the perforation 31 therein and a seal applied, thereby preventing the removal of the screw 24 unless the seal is broken and thereby preventing an opening of the door without breaking the seal.

In order to support the door in its opened position we preferably provide a spring latch 32 which is mounted upon a pivot bolt 33 around which is wound a spring 34 having an offset extremity which engages the latch and holds it in its upwardly extending position. The latch is formed with a handle 35 whereby it may be readily actuated. When the door is swung to its opened position, the corner of the door will slip past the latch 32, turning the latch against the force of the spring. When the door has passed the latch, the latch will spring to the position illustrated in Fig. 2 and hold the door supported. We do not wish to limit ourselves to this particular means of holding the door supported.

The car and door are constructed as ordinarily but preferably the door is formed of two thicknesses of material, the boards of the outside thickness extending vertically or in one direction, while the boards of the inside thickness extend at an angle to the boards of the outside thickness, thus preventing the door from warping.

In order to prevent the insertion of an instrument between the abutment 5 and the adjacent edge of the door when the door is closed, we attach to the face of the abutment 5 the protecting plate 36 which is of sheet metal and extends the whole length of the abutment and projects inwardly beyond the inner edge of the abutment. The inner margin of this sheet metal plate is slightly curved outward so as to form a guide permitting the door to be readily swung into position. When the door is swung into position and locked, the edge of the door and the adjacent edge of the abutment will be protected by the plate 5.

It will be seen that our device is simple in construction, easily applied to doors and that the door swings open very readily when once unlocked. Sliding car doors are very apt to stick and it is very difficult to push them open. The necessity of providing some means permitting the door to move outward in order to permit it to slide readily and forcing it inward when in its closed position also tends to complicate sliding door constructions. Our device is particularly simple and when unlocked and the screw 24 removed, the door swings downward and may be readily turned to its opened position.

What we claim is:

A car having a door opening, a vertically disposed abutment extending parallel to one margin of the door opening, an angular supporting member attached to the inside of the car, projecting out from the car and then downward, a door disposed between the outwardly and downwardly extending end of the supporting member in position to close said opening, a pivot bolt passing through said member, through the door and through the car forming a pivot for the door, and a guide mounted at one end upon said pivot bolt and extending parallel to the upper margin of the door opening and attached at its other end to said abutment.

In testimony whereof we affix our signatures in presence of two witnesses.

WILLIAM H. HOLLAND. [L. S.]
FRANK J. KALTENBACH. [L. S.]

Witnesses:
 H. B. SEYBOLD,
 A. J. PORTER.

Copies of this patent may be obtained for five cents each, by addressing the "Commissioner of Patents, Washington, D. C."